US005800209A

United States Patent [19]

Suzuki

[11] Patent Number: 5,800,209

[45] Date of Patent: Sep. 1, 1998

[54] ELECTRICAL CONNECTOR AND AFFIXING MEMBER

[75] Inventor: Kenji Suzuki, Kawasaki, Japan

[73] Assignee: Berg Technology, Inc., Reno, Nev.

[21] Appl. No.: 640,761

[22] PCT Filed: Nov. 11, 1994

[86] PCT No.: PCT/US94/12818

§ 371 Date: Jul. 12, 1996

§ 102(e) Date: Jul. 12, 1996

[87] PCT Pub. No.: WO95/13636

PCT Pub. Date: May 18, 1995

[30] Foreign Application Priority Data

Nov. 12, 1993 [JP] Japan .................................... 5-060959

[51] Int. Cl.[6] .............................. H01R 13/73; H02B 1/01

[52] U.S. Cl. .............................................................. 439/571

[58] Field of Search ............................ 439/567, 571–573

[56] References Cited

U.S. PATENT DOCUMENTS

| | | | |
|---|---|---|---|
| 3,261,909 | 7/1966 | Rust et al. | 439/567 |
| 4,173,387 | 11/1979 | Zell | 339/196 |
| 4,193,108 | 3/1980 | Romano | 361/399 |
| 4,202,593 | 5/1980 | Abernethy et al. | 339/125 R |
| 5,108,308 | 4/1992 | Northcraft et al. | 339/125 R |
| 5,241,451 | 8/1993 | Walburn et al. | 439/567 |
| 5,266,052 | 11/1993 | Phillips, II | 439/562 |
| 5,281,166 | 1/1994 | Yu et al. | 439/571 |
| 5,322,452 | 6/1994 | Mosquera | 439/567 |
| 5,460,543 | 10/1995 | Kosmala | 439/567 |

FOREIGN PATENT DOCUMENTS

| | | |
|---|---|---|
| 2237332 | 7/1975 | France . |
| 4016890 A1 | 11/1991 | Germany . |
| 4233476 A1 | 9/1993 | Germany . |
| 2-27676 | 2/1990 | Japan . |

*Primary Examiner*—Neil Abrams
*Assistant Examiner*—Katrina Davis
*Attorney, Agent, or Firm*—Woodcock Washburn Kurtz Mackiewicz & Norris LLP

[57] ABSTRACT

An affixing member is provided which can affix an electrical connector to a board, including a plastic cylindrical member inserted into a hole of the board, where the cylindrical member is situated in a lower recess of the plastic housing of the electrical connector. The outer diameter of the cylindrical member is smaller than the inner diameter of the hole of the board so the cylindrical member may be inserted into the board with little insertion force. The cylindrical member has a hollow section allowing a section of a push pin to be inserted therein. The inner diameter of the lower portion of the section is smaller than the outer diameter of the forward end of the section of the pin so when the section of the pin is inserted into the hollow section of the cylindrical member, the cylindrical member is enlarged and affixed to the board.

7 Claims, 5 Drawing Sheets

ELECTRICAL CONNECTOR AND AFFIXING MEMBER

BACKGROUND OF THE INVENTION

1. Field of the Invention

The present device relates to components used to affix or mount an electrical connector to a printed circuit board, in particular, to components of the electrical connector used to affix the housing of the electrical connector to the board.

2. Description of Related Art

Affixing members of electrical connectors for mounting or affixing the housing of the electrical connector to a printed circuit board generally include a plurality of legs extending from the housing. One known type of affixing member of an electrical connector includes a pair of elastically deformable plastics legs which are integrally formed at both ends of the housing of the electrical connector. Each plastic leg has a diameter which is larger than the diameter of a corresponding insertion hole of the board. In practice, the plastic leg is forcibly inserted into an corresponding insertion hole of the board thus reducing the diameter of the plastic leg to the diameter of the insertion hole so that the plastic leg and correspondingly, the housing, is affixed to the board.

Another known affixing member of an electric connector includes a pair of forked metal legs which are attached to both ends of the housing of the electrical connector where each forked metal leg has two tines. The two tines of the metal legs are configured to have a greater width or diameter than the diameters of corresponding insertion holes of a board. The metal legs are forcibly inserted into the corresponding insertion holes of the board thus reducing the diameter of the metal legs to diameters of the insertion holes so that the metal legs and correspondingly, the housing, are affixed to the board. Further, a latching claw may be provided at the forward end of the tines of each forked leg. In operation, the latching claw is used to latch the rear surface of the board so that the metal legs and correspondingly, the housing, are more positively affixed to the board.

The known affixing members using or including plastic legs or metal legs may be disadvantageous when a substantial force or power is required to forcibly insert one of the legs into an insertion hole of a board. In this situation, the operation of mounting the electrical connector to the board is difficult because only one leg of the pair of legs may be inserted at a time due to the substantial force or power required.

In addition, known affixing members including plastic legs tend to be deformed when inserted into the hole in the board due to the excessive stress produced by reducing the diameter of the legs to the diameter of the board. Known affixing members including metal legs, on the other hand, tend to damage the area near the insertion hole of the printed circuit board or the inner wall of the insertion hole due to rigidity of the metal legs and latching claws (if used) and the pliable nature of the printed circuit board.

Further, the known affixing members including plastic legs and metal legs require mounting space greater than the thickness of the printed circuit board. In particular, the legs, when inserted, project below the printed circuit board so that it becomes necessary to secure space below the printed circuit board for the legs. The additional space required for these affixing members does not meet the demands for reduced space consumption of printed circuit boards, in particular, in such applications as notebook computers, etc.

SUMMARY OF THE INVENTION

It is accordingly an object of the present invention to provide an electrical connector or an affixing member of an electrical connector which overcomes the above mentioned problems of known affixing members. In particular, it is, an object of the present invention to provide an electrical connector or an affixing member for an electrical connector which requires a small insertion force to be inserted into insertion holes of a board to prevent or reduce damage to the board or the affixing member. Another object of the present invention is to provide an electrical connector or an affixing member of an electrical connector which does not require space below the board when inserted, thus alleviating the need of securing space below the board.

The present invention relates to an electrical connector to be affixed to an insertion hole in a board. In a preferred embodiment, the connector comprises a pin having an outer diameter and a housing, the housing comprising an integral cylindrical member situated in a recess provided on a lower surface side of the housing of the electrical connector, the cylindrical member being configured to be insertable in a substantially coaxially manner within the insertion hole in the board, having an outer diameter smaller than an inner diameter of the insertion hole in the board to enable the cylindrical member to be inserted into the board insertion hole with zero or a small insertion force, and having a hollow section for receiving the pin substantially coaxially with the insertion hole in the board where at least a portion of the hollow section of the cylindrical member has an inner diameter smaller than the outer diameter of the pin, the cylindrical member further having a plurality of segmented outer peripheral portions enabling at least a portion of the cylindrical member to split along a direction when the pin is fully inserted and a connecting member for connecting the plurality of outer peripheral portions together at a forward end of the cylindrical member, the force of the pin on the portion of the cylindrical member causing the outer diameter of the cylindrical member to be enlarged to affix a portion of the cylindrical member to the insertion hole of the board when the pin is fully inserted into the hollow section of the cylindrical member.

In the present device, the "electrical connector" has an injection-molded housing and is intended to mean a connector to be mounted on the board, such as a board-to-board interconnect connector.

DESCRIPTION OF THE PREFERRED EMBODIMENTS

Figure 1:
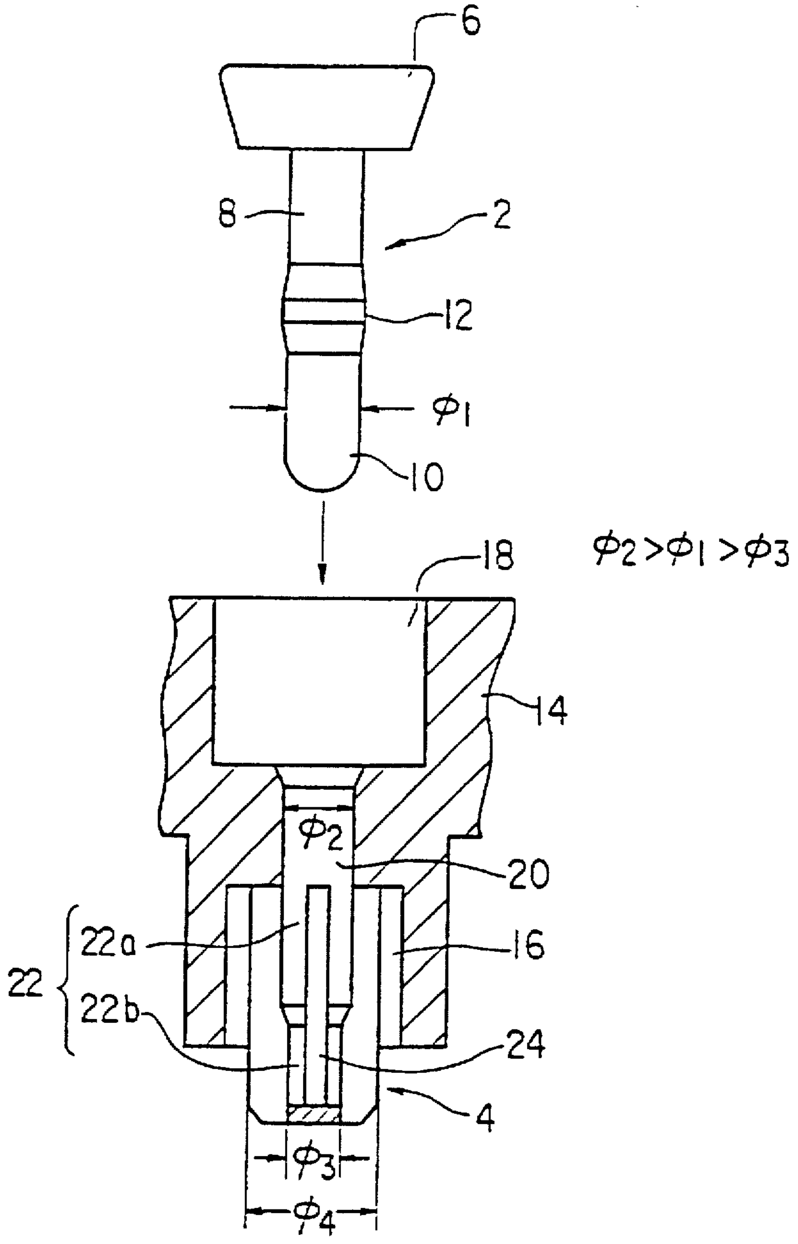
FIG. 1 is a partly broken away side view of an electrical connector or an affixing member of an electrical connector according to one embodiment of the present invention with a push pin not yet inserted into a cylindrical member.

As shown in FIG. 1, an electrical connector or an affixing member of an electrical connector of the present invention includes a push pin 2 and a cylindrical member 4 designed to receive the push pin when inserted therein. The push pin 2 has a head 6 and a pin section 8 extending from the head. A projection 12 on the pin section 8 is provided at an area between a base end (by the head) and a forward end 10 of the pin section 8, that is, at a middle area of the pin section 8. The projection 12 is formed concentric with the pin section 8. The forward end 10 of the pin section 8 has an outer diameter of $\phi 1$.

The cylindrical member 4 is integrally molded with the connector housing 14. The cylindrical member 4 is situated in a lower recess 16 on the lower surface side of the injection-molded type plastic housing 14 of the electrical connector. In addition, an upper recess 18 is provided on the upper surface side of the connector housing 14 to receive the head 6 of the push pin 2. The lower recess 16 and upper recess 18 communicate with each other via a passage 20 through which the pin section 8 of the push pin 2 may be inserted. An inner diameter $\phi 2$ of the passage 20 is made somewhat larger than the outer diameter $\phi 1$ of the forward end 10 of the pin section 8.

A hollow section 22 is provided in the cylindrical member and leads to the passage 20 in the connector housing 14. The hollow section 22 has a large-diameter section 22a with an inner diameter $\phi 2$, i.e., identical to the diameter of the passage 20. This allows the pin section 8 of the push pin 2 to be inserted therein with little or no insertion force.

The hollow section 22 also has a small-diameter section 22b situated below the large-diameter section 22a of the hollow section 22, the small-diameter section 22b having an inner diameter $\phi$'which is much smaller than the inner diameter $\phi 2$ of the large-diameter section 22a and outer diameter $\phi 1$ of the forward end 10 of the pin section 8. A plurality of contact terminals (not shown) for board-to-board interconnection are arranged in the housing 14.

Figure 2:
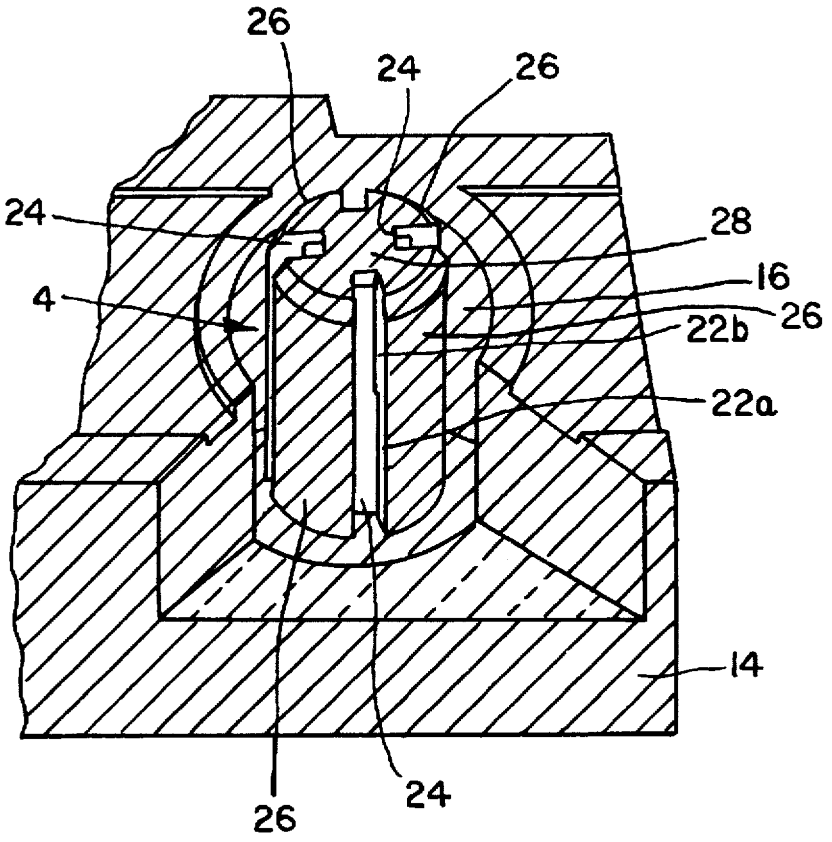
FIG. 2 is a partly broken away perspective view of the cylindrical member shown in FIG. 1 viewed from the lower side of the connector housing.

As shown in FIG. 2, the cylindrical member 4 has a substantially circular column-like configuration. The circular column has four segmented columns 26 of an arcuate cross-section into which the circular column is split along the direction in which the push pin 2 is inserted. The four segmented columns 26 are formed by the four slits 24. A circular disc 28 is used to connect the four arcuate columns 26 together at a central area at the lower end faces of the columns 26. The respective arcuate columns 26 differ in thickness at the upper and lower areas according to the diameters of large-diameter section 22a and small-diameter section 22b of the hollow section 22.

The circular disc 28 serves to facilitate the formation of four segmented arcuate columns 26 during the injection molding the connector housing 14 during which molten plastic flows along the four segmented arcuate columns 26. The circular disc 28 also holds the four arcuate columns 26 in an integral way providing a greater mechanical strength than in the case where the four arcuate columns 26 are connected. The greater mechanical strength enables the four arcuate columns to suffer no mechanical failure due an unwanted force, such as that encountered due to their contact with a foreign matter during transportation and handling.

Figure 3:
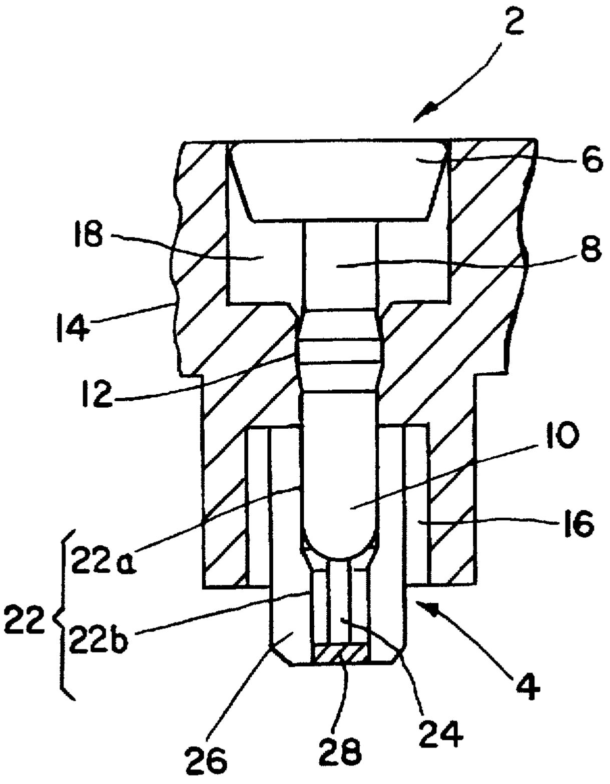
FIG. 3 is a side view showing the affixing member with the push pin temporarily inserted into the cylindrical member in a way corresponding to FIG. 1.

As shown in FIG. 3, the push pin 2 is temporarily inserted, that is, partially inserted, into the hollow section 22 of cylindrical member 4 prior to being mounted on a printed circuit board of the electrical connector. In particular, the forward end 10 of push pin 2 is inserted through the upper recess 18, the passage 20 in the connector housing 14 and into the large-diameter section 22a of the hollow section 22, i.e., the forward end 10 is situated immediately before the small-diameter section 22b (having an inner diameter $\phi 3$) of the hollow section 22. In the partially inserted state shown in FIG. 3, because the outer diameter of the projection 12 of the push pin 2 is greater than the inner diameter $\phi 2$ of the passage 20 in the connector housing 14, the projection 12 engages the walls of the passage 20. The force or magnitude of the engagement is selected to be great enough to prevent the push pin 2 from becoming separated from the electrical housing 14 due to any vibration or shock encountered during transportation or handling.

Figure 4:
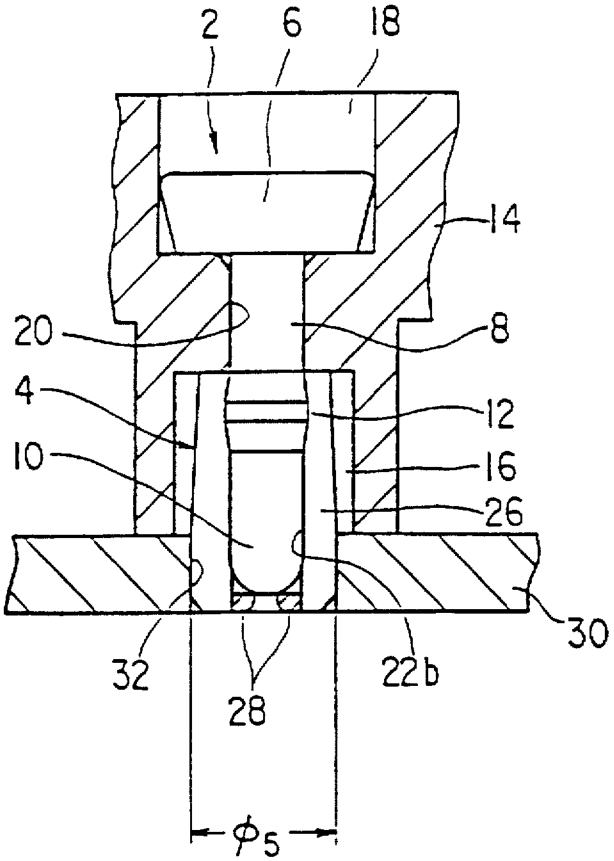
FIG. 4 is a partly broken away side view of the affixing member and a printed circuit board where the push pin is fully inserted into the cylindrical member and the affixing member is designed not to project below the lower surface of the printed circuit board.

During the process of mounting the electrical connector housing 14 on a printed circuit board, the cylindrical member 4 is inserted into the insertion hole 32 of the printed circuit board 30. Because the outer diameter $\phi 4$ of the cylindrical member 4 is somewhat smaller than the inner diameter $\phi 5$ of the insertion hole 32 of the printed circuit board 30, the cylindrical member 4 can be inserted into the insertion hole 32 with a low insertion force, preferably a zero insertion force. After the cylindrical member 4 is inserted into the insertion hole 32 (not shown as a separate step in the Figures), the pin section 8 of the push pin 2, in particular the forward end 10, is fully inserted into the hollow section 22 of the cylindrical member 4 as shown in FIG. 4. The pin is inserted fully into the hollow section 22 of the cylindrical member 4 by pushing the head 6 of the push pin 2 by a push rod (not shown), for example.

The outer diameter $\phi 1$ of the forward end 10 of the push pin 2 is greater than the inner diameter $\phi 3$ of the small-diameter section 22b of the hollow section 22. As a consequence, when the forward end 10 of the push pin 2 is inserted into the small-diameter section 22b of the hollow section 22, the four arcuate columns 26 of the cylindrical member 4 are pushed outward in a direction away from the pin 2 or the center of the cylindrical member 4 as viewed in cross-section. When the forward end 10 is inserted into the small-diameter section 22a of hollow section 22, the circular disc 28 connecting together the four arcuate columns 26 is broken as indicated in cross-section in FIG. 4 because the circular disc 28 cannot follow the deformation of the four arcuate columns 26.

An inward reaction force is generated from the inner wall of the insertion hole 32 of the circuit board 30 against the outward force created by the four arcuate columns 26 being pressed outwardly spread by the pin section 8 of the push pin 2. In addition, an elastic force is generated by the plastic arcuate columns 26 which are trying to retain their initial volume. As a consequence of the forces, the arcuate columns 26, and thereby, the cylinder member 4, become affixed to the insertion hole 32 of the circuit board 30. As a further consequence, the electrical connector housing 14 also becomes affixed to the circuit board 30 since the cylindrical member 30 is integrally molded to the housing 14.

As shown in FIG. 4, the cylindrical member 4 may be configured to have a structure that does not project below the lower surface of the circuit board 30 when affixed to the circuit board 30. In this configuration of the cylindrical member 4, it is not necessary to secure space below the lower surface of the circuit board 30 for the cylindrical member 4.

Figure 5:
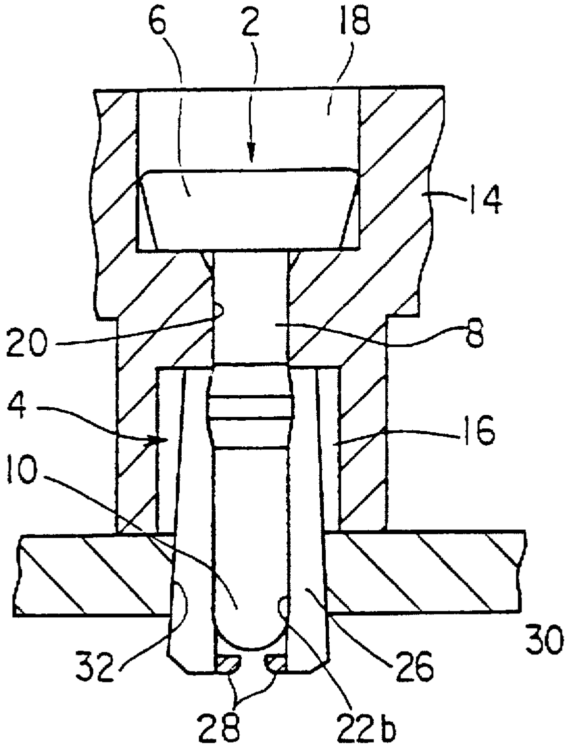
FIG. 5 is a side view of an affixing member similar to the member shown in FIG. 4 except that the affixing member is designed to project below the lower surface of a printed circuit board.

If space is available or may be secured below the lower surface of the circuit board 30, the cylindrical member 4 may be configured so that its lower end may project below the lower surface of the circuit board 30 as shown in FIG. 5. In this configuration of the cylindrical member 4, additional affixing force is obtained.

Although, in the above-mentioned embodiment, the connecting member 28 is comprised of the circular disc made of plastics which is broken when the pin 2 is fully inserted into the cylindrical member 4, the material, shape and characteristics of the connecting member 28 are not so restricted. In particular, the material selected for the connecting member 28 (and connector housing 14) may be a resin (such as a resin containing a small amount of or no glass). The connecting member may be formed having a greater elongation or to have other configurations, such as a criss-cross configuration.

In these other configurations of the connecting member 28, the connecting member 28 may not be broken when the forward end 10 of the push pin 2 is inserted into the small-diameter section **22*b* of the hollow section 22 because the connecting member 28** may be elongated to a thin thickness without being broken.

What is claimed is:

1. An electrical connector to be affixed to an insertion hole in a board, the connector comprising:

a pin having an outer diameter; and a housing, the housing comprising an integral cylindrical member situated in a recess provided on a lower surface side of the housing of the electrical connector, said cylindrical member being configured to be insertable in a substantially coaxially manner within the insertion hole in the board, having an outer diameter smaller than an inner diameter of the insertion hole in the board to enable the cylindrical member to be inserted into the board insertion hole with zero or a small insertion force, and having a hollow section for receiving the pin substantially coaxially with the insertion hole in the board where at least a portion of the hollow section of the cylindrical member has an inner diameter smaller than the outer diameter of the pin, the cylindrical member further having a plurality of segmented outer peripheral portions enabling at least a portion of the cylindrical member to split along a direction when the pin is fully inserted and a connecting member for connecting the plurality of outer peripheral portions together at a forward end of the cylindrical member, the force of said pin on said portion of the cylindrical member causing the outer diameter of the cylindrical member to be enlarged to affix a portion of the cylindrical member to the insertion hole of the board when the pin is fully inserted into the hollow section of the cylindrical member.

2. An electrical connector according to claim 1, wherein the housing of the electrical connector is formed by injection molding.

3. An electrical connector according to claim 1, wherein said portion of the hollow section is located at said forward end of the cylindrical member and said forward end is inserted into the insertion hole of the board.

4. An electrical connector according to claim 1, wherein the cylindrical member is configured not to project beyond a lower surface of the board when inserted in the insertion hole in the board.

5. An electrical connector according to claim 1, wherein the pin has a head and a pin section, the pin section including a forward end having the outer diameter and a projection between the head and the forward end and having an outer diameter greater than an inner diameter of the hollow section of the cylindrical member.

6. An electrical connector according to claim 1, wherein the housing of the electrical connector includes an upper recess for accommodating the head of the pin.

7. An electrical connector according to claim 1, the housing further comprising:

an upper surface; and a passage between the upper and lower surfaces.

* * * * *